(12) United States Patent
Brookhyser et al.

(10) Patent No.: US 9,023,461 B2
(45) Date of Patent: May 5, 2015

(54) APPARATUS FOR OPTICALLY LASER MARKING ARTICLES

(75) Inventors: James Brookhyser, Portland, OR (US); Kyle Ball, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 882 days.

(21) Appl. No.: 12/909,759

(22) Filed: Oct. 21, 2010

(65) Prior Publication Data

US 2012/0100348 A1    Apr. 26, 2012

(51) Int. Cl.
*B23K 26/36*     (2014.01)
*B23K 26/06*     (2014.01)
*B41M 5/24*      (2006.01)
*B23K 26/40*     (2014.01)

(52) U.S. Cl.
CPC ............... *B23K 26/063* (2013.01); *B41M 5/24* (2013.01); *B23K 26/36* (2013.01); *B23K 26/409* (2013.01); *B23K 26/4095* (2013.01)

(58) Field of Classification Search
CPC ............ G02F 1/11; G02F 1/113; B41M 5/24; B23K 26/063; B23K 26/36; B23K 26/409; B23K 26/4095
USPC .......................... 428/195.1; 359/305; 347/255
See application file for complete search history.

(56) References Cited

U.S. PATENT DOCUMENTS

| | | | |
|---|---|---|---|
| RE29,421 E * | 9/1977 | Scott | 372/13 |
| 5,171,650 A * | 12/1992 | Ellis et al. | 430/20 |
| 6,433,301 B1 | 8/2002 | Dunsky et al. | |
| 7,027,199 B2 | 4/2006 | Johnson | |
| 8,194,307 B2 * | 6/2012 | Arnold et al. | 359/307 |
| 8,379,678 B2 | 2/2013 | Zhang et al. | |
| 8,389,895 B2 | 3/2013 | Reichenbach et al. | |
| 2008/0094640 A1 | 4/2008 | Cordingley et al. | |
| 2008/0152859 A1 | 6/2008 | Nagai | |
| 2011/0193928 A1 | 8/2011 | Zhang | |
| 2011/0233177 A1 | 9/2011 | Panarello et al. | |
| 2012/0298650 A1 | 11/2012 | Nowak et al. | |

FOREIGN PATENT DOCUMENTS

JP         60-204392        10/1985

(Continued)

OTHER PUBLICATIONS

"Acousto-optic Modulator Driver" by Noah Industries from http://www.noahcorp.com/graphics/AODriver.pdf. Available online 2006.*

(Continued)

*Primary Examiner* — Gerard Higgins

(57) ABSTRACT

The present invention relates to laser marking articles. In particular it relates to laser marking articles by laser ablating a coating applied to the article which reveals the surface of the article underneath, thereby forming the mark by the contrasting appearance between the revealed surface of the article and the adjacent remaining coating. Laser parameters are selected to provide uniform, commercially desirable appearance and avoid damage to the underlying surface while maintaining acceptable system throughput. In particular the laser pulse envelope is tailored to provide desirable appearance while maintaining acceptable system throughput.

23 Claims, 10 Drawing Sheets

(56) References Cited

FOREIGN PATENT DOCUMENTS

| | | |
|---|---|---|
| JP | 04-307288 | 10/1992 |
| JP | 6021124 U | 3/1994 |
| JP | 6297828 A | 10/1994 |
| JP | 7246482 A | 9/1995 |
| JP | 2002-370457 A | 12/2002 |
| JP | 03610078 B2 | 1/2005 |
| JP | 2005-186153 A | 7/2005 |
| WO | WO 2008106403 A2 * | 9/2008 |

OTHER PUBLICATIONS

Internet Archive of http://www.noahcorp.com/graphics/AODriver.pdf.*
International Search Report of PCT/US2011/061195, 2 pages.
Written Opinion of PCT/US2011/061195, 3 pages.
Francois Brygo, et al., "Laser Fluence, Repetition Rate and Pulse Duration Effects on Paint Ablation",, Applied Surface Sceience 252, 2006, 8 pages.

* cited by examiner

APPARATUS FOR OPTICALLY LASER MARKING ARTICLES

TECHNICAL FIELD

The present invention relates to laser marking articles. In particular it relates to laser marking articles by laser ablating a coating applied to the article which reveals the surface of the article underneath, thereby forming the mark by the contrasting appearance between the revealed surface of the article and the adjacent remaining coating. The mark may also be formed by laser ablating the first or topmost coating layer to reveal a second coating layer underneath forming the mark by the contrast between the revealed second coating and adjacent first coating. Laser parameters are selected to provide uniform, commercially desirable appearance and avoid damage to the underlying surface while maintaining acceptable system throughput. In particular the laser pulse envelope is tailored to provide desirable appearance while maintaining acceptable system throughput.

BACKGROUND OF THE INVENTION

Marketed products commonly require some type of marking on the product for commercial, regulatory, cosmetic or functional purposes. A mark is defined as contiguous region or area on the surface of the article which contrasts visually with the adjacent surface. Desirable attributes for marking include consistent appearance, durability, and ease of application. Appearance refers to the ability to reliably and repeatably render a mark with a selected shape and uniform color and optical density. Durability is the quality of remaining unchanged in spite of abrasion to the marked surface. Ease of application refers to the cost in materials, time and resources of producing a mark including programmability. Programmability refers to the ability to program the marking device with a new pattern to be marked by changing software as opposed to changing hardware such as screens or masks.

Of particular interest is creating marks on coated or painted articles. Articles made of metal or various types of plastics are often painted or otherwise covered in various industrial coatings to protect and change the appearance of the article's surface. Laser ablating the coating in particular patterns to remove the coating and reveal the surface of the article underneath is a desirable way to create a mark on article. Covering an article with two or more layers of coatings and laser ablating a first coating to reveal a second coating underneath is another desirable way to create marks. Marking a product by removing a coating with a laser to reveal the article underneath is discussed in US patent application no. 2008/0152859, inventor Masanori Nagai published Jun. 26, 2008. This method depends upon the brightness of the coating being brighter than the surface of the article. Japanese patent application no. 03-150842, inventor Iwasaki Noboru, published Oct. 29, 1992, describes removing one or more coating layers with a laser to reveal a coating layer underneath.

One thing that these references have in common is that in order to remove a coating without removing materials beneath the coating layer being removed, the laser ablation threshold for the material being removed must be lower than the laser ablation threshold of the material underneath. Laser ablation threshold is the minimum energy required to cause removal of material. This removal may be ablative, where enough energy is put into the material by the laser to cause the material to disassociate into plasma, or thermal, where the material is essentially melted and vaporized, or a combination of the two. Related to the ablation threshold is the damage threshold. The damage threshold is the minimum laser energy required to cause an undesirable change in the appearance of the material. The damage threshold for materials is generally lower and sometimes much lower than the ablation threshold. We define damage as any undesirable change in the appearance of the materials that comprise the article or under lying coating following laser removal of the topmost layer.

In order to cleanly and completely remove a top layer of material leaving the surface of the article undamaged, laser fluence must be greater than the ablation threshold for the overlying material and less than the ablation or damage threshold for the underlying material or surface of the article. In many cases this difference may be small, requiring precise control of laser fluence. In addition, the actual values for ablation and damage thresholds for these materials may vary depending upon location and slight variations in application. Also, actual values for ablation and damage thresholds for these materials may vary as a function of time; as the article is processed, heat generated by the laser removal process may be retained by the article or coatings and influence the ablation or damage thresholds. Therefore, while a single laser fluence may be selected that permits commercially desirable marking to be performed on a particular article at a particular time with a particular laser, any small change in the article or coatings or laser could result in the process no longer producing desirable results. The difference between the minimum fluence that will result in ablation of desired materials and avoid damage to underlying materials is called a process window. In manufacturing it is highly desirable to increase the process window for a particular article and mark to the greatest practical extent in order to handle variations in materials and processing systems without requiring system adjustments which negatively affect system throughput.

What is desired but undisclosed by the art is a reliable and repeatable method for removing material that does not leave undesired material on the surface of the article or require frequent adjustment of the equipment. What is needed then is a method for reliably and repeatably creating marks having a desired appearance on coated articles using a laser to remove a layer of coating without leaving undesired material on the under laying materials while maintaining acceptable system throughput.

SUMMARY OF THE INVENTION

Aspects of this invention create a mark with desired properties on coated articles using a laser marking system. The laser marking system is provided with a controllable beam attenuator that transmits the laser beam at a first attenuation level and then, after a predetermined time interval, changes the attenuation to a second attenuation level thereby creating a laser mark with desired properties. Adding a controllable beam attenuator permits controllable laser fluence. Fluence is defined as the cumulative laser energy applied per unit area and is measured in Joules/cm$^2$. Aspects of this invention provide a first laser fluence associated with creating a mark with desired properties on a first portion of the mark. Aspects of this invention then provide a second laser fluence associated with creating a mark with desired properties on a second portion of the mark, thereby creating marks with desired properties Creating marks on a coated article by ablating a top coating layer to reveal an under layer which may be another coating or the surface of the article requires that the ablation threshold for the material to be ablated be lower than the ablation threshold for the material underneath. In most cases this can be arranged by appropriate selection of materials. For example, a topmost coating or paint that is darker, or less reflective than the under layer will absorb more laser energy and typically will ablate at a lower fluence threshold than the under layer.

Aspects of this invention consider damage thresholds when marking in order to create marks with desirable appearance. In order to create marks efficiently, irradiance is adjusted to maximize material removal rates without damaging underlying materials. The irradiance combined with the tool path determines the fluence, since the irradiance measures the rate at which energy is applied to the surface of the article and the tool path indicates how much time the laser beam will directed to each point on the mark. The irradiance and tool path of the laser beam is calculated to be above the ablation threshold of the material to be removed and below the damage threshold of the underlying material while maximizing the rate of travel of the laser beam with respect to the article in order to maximize throughput. The difficulty is that these thresholds can be different for different areas of the mark at different times during the marking process. Laser parameters which provide commercially desirable appearance and acceptable rate of material removal and hence throughput in one area of the mark may damage the underlying material in another area of the mark. FIG. 2 shows the results of laser marking an article with a single irradiance and rate of travel, wherein the results are uneven and commercially unacceptable. Choosing a single set of laser parameters which results in commercially desirable appearing mark may be possible but the resulting rate of material removal must not exceed the fastest acceptable removal rate for the all portions of the mark, resulting in unacceptably low throughput. Aspects of this invention provide greater laser fluences at the start of each set of laser pulses in order to remove material that typically remains if a single laser fluence is used.

The damage threshold for a material at a particular location is not only dependent upon the laser irradiance being currently directed at the location but also on the recent history of exposure to laser radiation. Therefore simply measuring laser fluence will not properly predict the appearance of the material following laser processing. This is because previous irradiation of the location or nearby locations will tend to heat the material. Based on the calculated residual heating, aspects of this invention alter the laser fluence to compensate for the decreased damage threshold caused by previous laser irradiation by increasing the fluence of the initial laser pulses in a group of laser pulses.

Aspects of this invention control various laser parameters including laser pulse parameters such as pulse duration or pulse repletion rate, or tool path parameters such as spot size, laser beam location, laser beam speed in order to increase throughput of a laser marking system while avoiding damage to underlying materials. A laser is selected and the power, rep rate, pulse temporal shape and pulse duration are selected to provide desired material removal rates. A tool path, or locations and times at which the laser will irradiate the article to form the mark, is then calculated to provide the desired material removal rate while avoiding damage to the underlying material. One tool path calculation is the spacing between subsequent pulses on the article which is controlled by changing the speed of the relative motion between the laser pulses and the article. Another tool path calculation is spot size which controls the irradiance by moving the focal spot in the Z axis to point above or below the surface of the article. A further tool path calculation calculates the spacing between adjacent rows of pulse locations. A tool path is selected which will cover the area to be marked in lines to be traveled in a raster fashion Aspects of this invention control the output of the laser. In order to facilitate application of tool paths as selected by this invention, laser pulse fluence should be attenuated very precisely under the control of the laser marking system. Aspects of this invention control the laser irradiance with sufficient precision to permit tool paths which create marks with commercially desirable uniformity, color, texture and shape. An optical switch is used to switch the laser beam on and off rapidly without requiring the laser to be turned off and on. Aspects of this invention use an acousto-optic modulator (AOM) to modulate the beam precisely and quickly and thereby direct the beam either to impinge the article or travel harmlessly to a beam dump.

Aspects of this invention are implemented by adapting an existing laser micromachining system, the ESI Model ML5900 Laser Micromachining System, manufactured by Electro Scientific Industries, Inc., Portland, Oreg. 97229. This system is described in detail in the "ESI Service Guide ML5900", part number 178472A, published October 2009, Electro Scientific Industries, Inc., Portland, Oreg. 97229, and is included herein in its entirety by reference. Adaptations include addition of an electro-optic device to permit more precise control of laser fluence in real time along with software to control these changes in fluence.

To achieve the foregoing with these and other aspects in accordance with the purposes of the present invention, as embodied and broadly described herein, a method for creating a visible mark with desirable commercial qualities on a coated article and apparatus adapted to perform the method is disclosed herein. Included is a laser processing system having a laser, laser optics, and motion stages all operatively connected to a controller with stored, predetermined laser pulse parameters. Stored laser pulse parameters associated with the desired fluence selected depending upon which region of the mark is being processed to create marks with commercially desirable properties.

DETAILED DESCRIPTION OF PREFERRED EMBODIMENTS

An embodiment of this invention creates a mark with desired properties on coated articles using a laser marking system. The laser marking system has controllable laser fluence or dose. Embodiments of this invention determine a first laser fluence associated with creating a mark with desired properties on a first portion of the mark. Aspects of this invention then determine a second laser fluence associated with creating a mark with desired properties on a second portion of the mark. These fluences are then stored in the laser marking system's storage. The laser marking system is then directed to mark the article using the stored first laser fluence in the first portion of the mark and using the stored second laser fluence in a second portion of the mark thereby marking the article with desired properties. Embodiments of this invention control laser fluence by controlling various laser parameters including laser pulse parameters such as pulse duration or pulse repletion rate, and tool path parameters such as spot size, laser beam location, or laser beam speed in order to increase throughput of a laser marking system while avoiding damage to underlying materials. Typically, a laser is selected and the power, rep rate, pulse temporal shape and pulse duration are selected to provide desired material removal rates. A tool path is then calculated to provide the desired material removal rate while avoiding damage to the underlying material. In particular embodiments of this invention provide increased laser pulse fluence for the beginning few laser pulses in a set of laser pulses in order to remove material that would otherwise remain on the surface of the article.

Embodiments of this invention control the output of the laser. In order to facilitate tool paths as selected by this invention, laser pulses should be attenuated very precisely under the control of the laser marking system. Aspects of this invention control the laser irradiance with sufficient precision to permit tool paths which create marks with commercially desirable uniformity, color, texture and shape. Aspects of this invention use an acousto-optic modulator (AOM) to modulate the beam precisely and quickly without requiring the laser to be turned on and off. An embodiment of this invention employs an AOM to modulate the fluence of the laser beam by diffractively redirecting the laser beam from its normal path to a beam dump where the laser beam energy is harmlessly dissipated rather than be directed to the article surface. An AOM is used because it is capable of modulating the laser beam very quickly. Fast modulation is advantageous for embodiments of this invention because it allows the laser marking system to turn the laser beam on and off rapidly and accurately without disturbing the laser itself.

Figure 1:
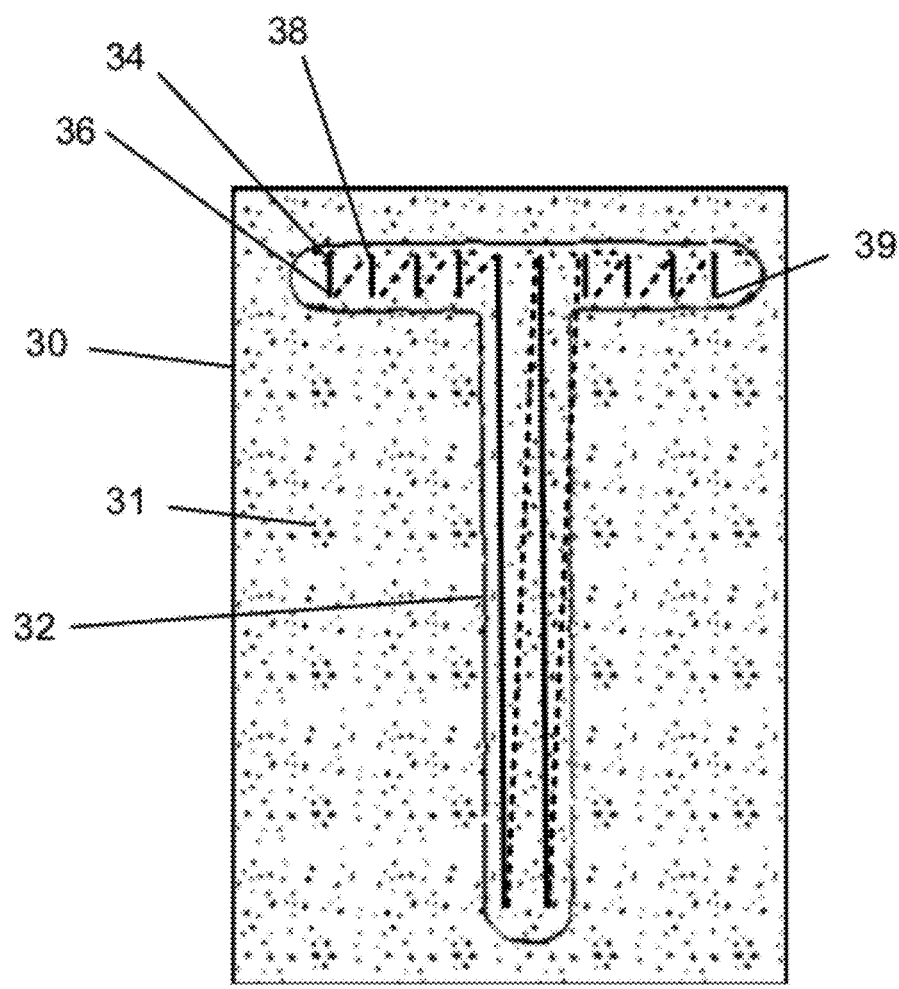
FIG. 1 Tool path
FIG. 2 Prior art mark
FIG. 3 Microphotograph of prior art laser mark
FIG. 4a Prior art laser pulses
FIG. 4b Laser pulses
FIG. 4c Laser pulses
FIG. 4d Laser pulses
FIG. 5 Laser mark
FIG. 6 Microphotograph of laser mark
FIG. 7 Adapted laser marking system
FIG. 8 Pulse circuit
FIG. 9 Pulse circuit
Figure 2:
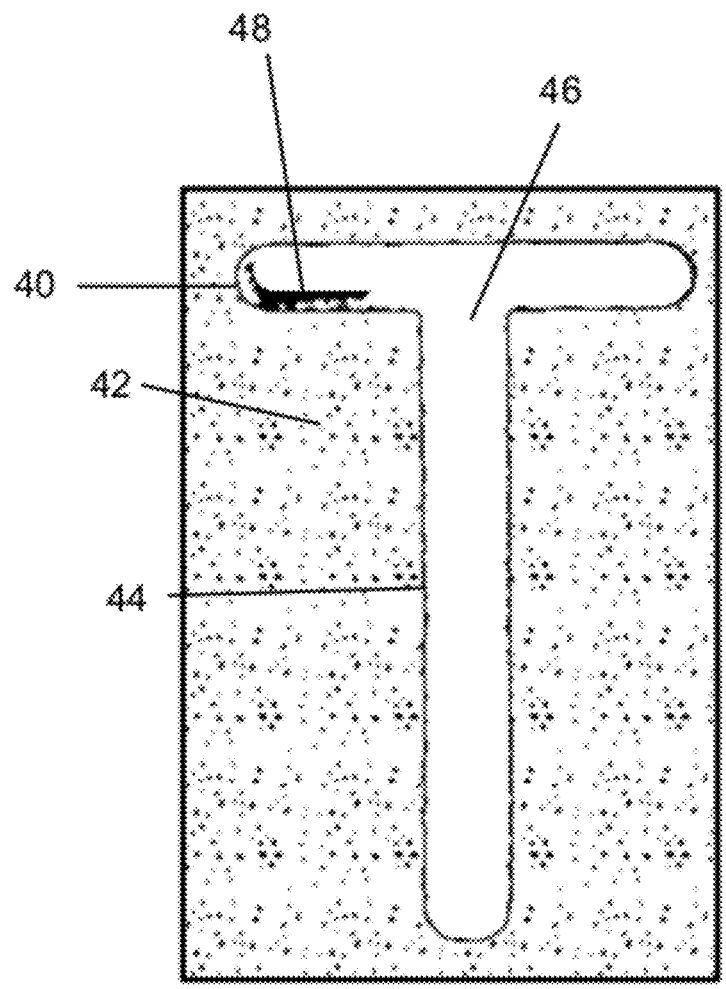
Figure 3:
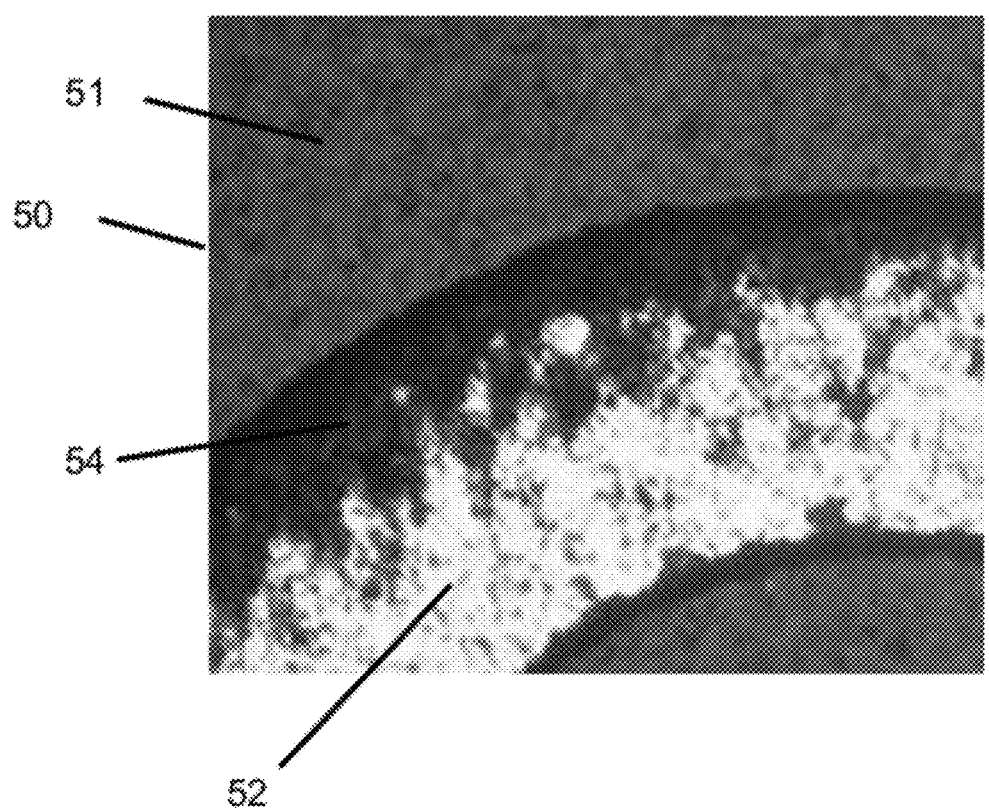

FIG. 1 shows a tool path used to remove a coating from an article. An article 30 is coated with a coating 31 to be removed within a shaped area 32. The laser begins removing material along the tool path 33 at its start point 34 and removes material as it moves to point 36, represented by the solid line. At point 36 the laser is turned off and the laser marking system re-positions the laser beam with respect to the article so that when the laser turns on, it begins removing material at point 38, represented by the dotted line. The laser then proceeds to cut and re-position until the end point 39 is reached. FIG. 2 shows the results of removing material as shown in FIG. 1. The article 40, with a coating 42 has had the coating removed from the area of the mark 44, exposing material underneath 46. Note that some of the overlying coating remains 48. This is because the particular laser irradiance used, while it is optimal for removing bulk material over the majority of the area to be marked, seems to be less effective in removing material at the beginning of the removal process. Irradiance is the rate at which laser energy is applied to the surface of the article per unit area and is measured in Watts/cm$^2$. One prior art solution to this problem is to adjust the fluence and the speed of the laser with respect to the article which may reduce throughput and is hence undesirable. The fact that adjustment itself is required is also undesirable as it negatively affects system throughput. FIG. 3 is a microphotograph showing this effect. In FIG. 3 an article 50 has been coated with a silver coating covered by a layer of black paint 51. A laser has been used to remove the black paint in an area 52. Note that some black paint residue 54 remains in the area 52 where black paint was supposed to have been removed by the laser.

Figure 4A:
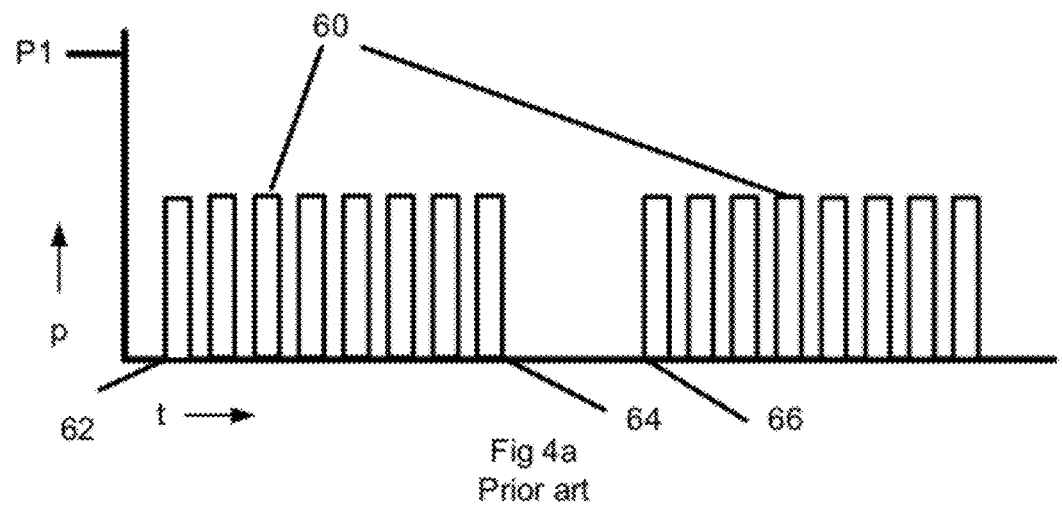
Figure 4B:
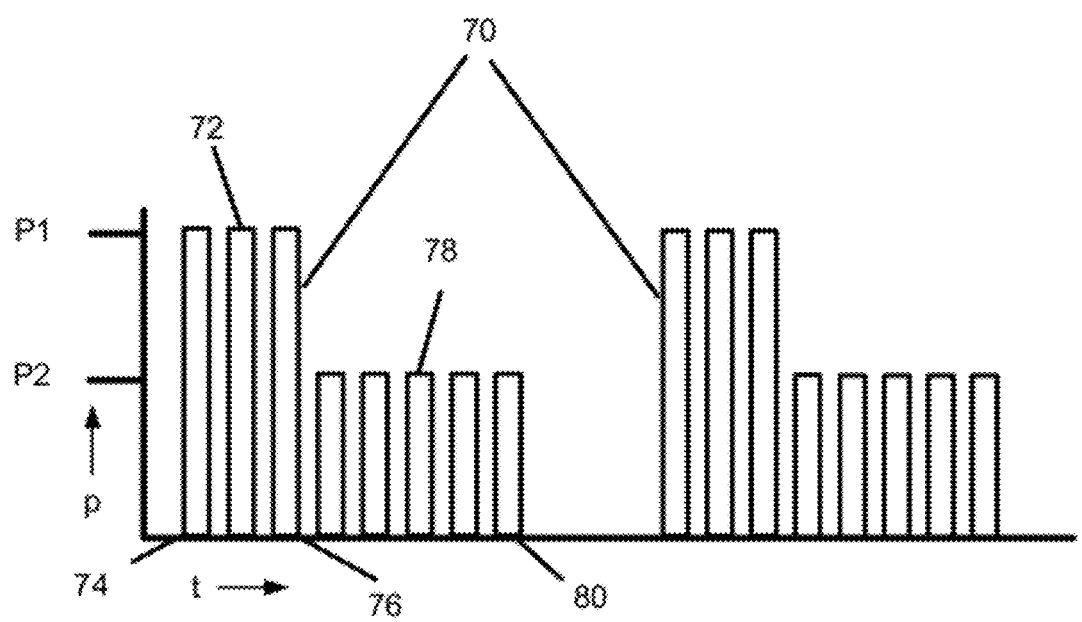

FIG. 4a shows is a graph of pulse energy vs. time showing groups of prior art laser pulses. Referring to FIG. 1, the laser pulses would start 62 when the laser beam was positioned at 34, with the pulses ending at 64 when the laser beam reached the end of that stroke 36. The laser beam is repositioned 38 and the laser pulses started again 66. With this group pulse profile, material removal is incomplete. Although a pulse fluence might be found that removes the material 51 without leaving debris 54, the laser fluence used to form the mark in FIG. 4a is outside the process window for that particular article at that particular time with that particular laser. An embodiment of this invention solves this problem by tailoring the group pulse profile to provide more energy at the beginning of a stroke while maintaining the specified energy for the remaining portion of the stroke. Tailoring the pulse group envelope in this fashion to form a tailored pulse profile permits commercially desirable marking while maintaining system throughput by using a higher energy pulses at the beginning of the pulse group before changing to pulses with a preselected lower energy to complete the pulse group. This tailored pulse profile creates wider process windows by permitting the use of lower laser fluences without leaving debris. A wider process window permits higher system throughput by reducing the need for system adjustments. An exemplary tailored pulse profile is shown in FIG. 4b. In FIG. 4b, two groups of tailored pulses 70 are shown. The pulse group 70 starts at time 74 with three pulses 72 at power P1. At time 76 the power is reduced to P2 and five more pulses 78 are directed to the workpiece until time 80. Each group of pulses is tailored in this fashion to have a predetermined number of pulses of predetermined energy emitted at the beginning of each stroke of the laser beam.

Figure 5:
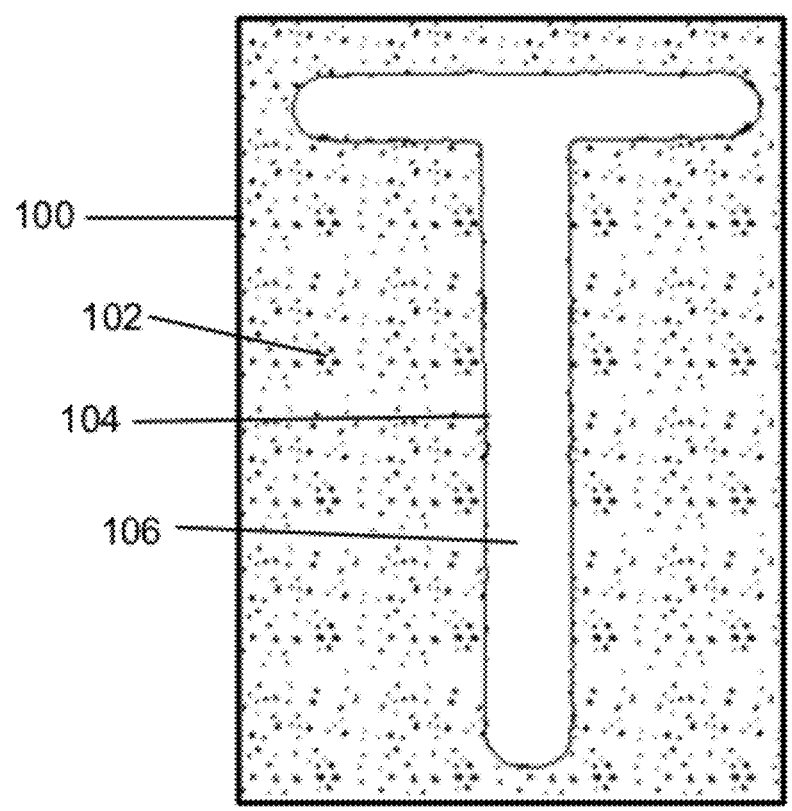
Figure 6:
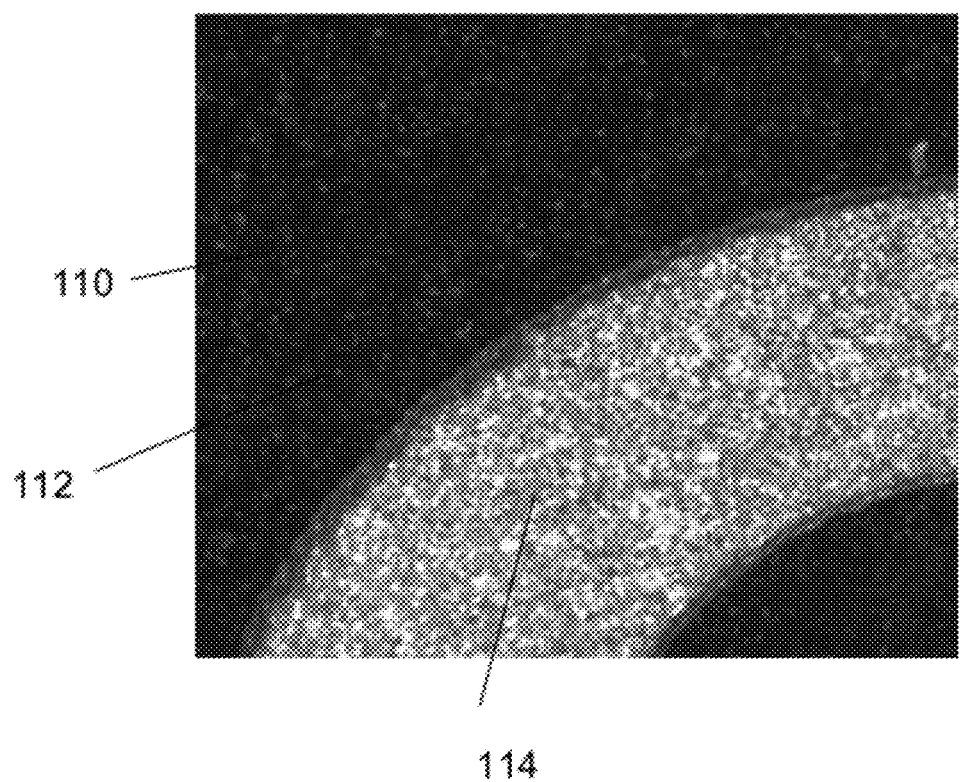

FIG. 5 shows an article 100 coated with a coating 102 with a shape boundary 104 which has been laser processed to remove the coating 106 within the boundary 194 by a tailored pulse groups in accordance with embodiments of this invention. Note that no debris apparently remains nor has damage occurred anywhere on the mark. FIG. 6 is a microphotograph of a similar coated article 110 which has been coated with black paint 112 that has been laser processed by an embodiment of this invention to cleanly and quickly remove the black paint 112 over a desired area to reveal silver paint underneath 114. Note the apparent lack of debris or damage to the underlying surface.

Figure 7:
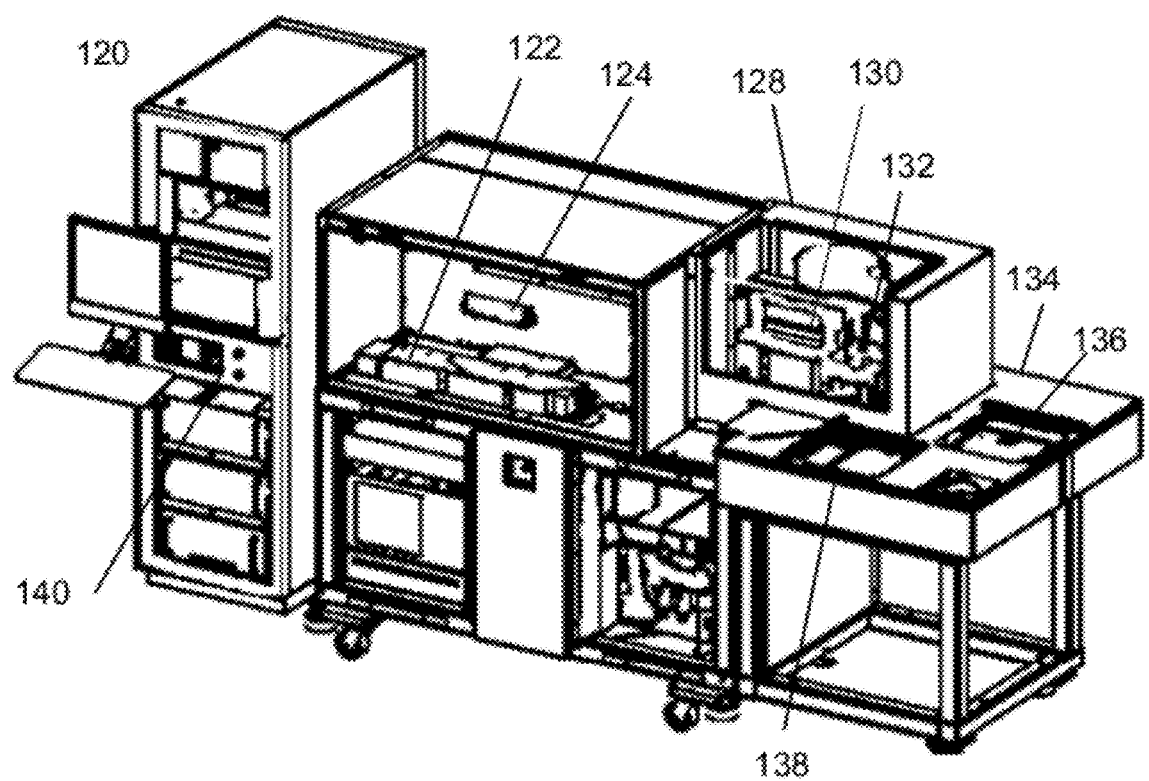

FIG. 7 shows a diagram of an adapted ESI Model ML5900 laser micromachining system 120 adapted for marking articles as an embodiment of the instant invention. Adaptations include a laser 122, and an AOM fluence attenuator 124. Laser pulses are emitted by the laser 122 and directed by a series of mirrors and other optical elements (not shown) to the AOM 124 fluence attenuator and thereafter directed by another series of mirrors and optical elements (not shown) to the optical head 128. The AOM fluence attenuator includes control electronics which control the fluence of transmitted laser pulses under the direction of the controller 140. The optical head includes the X, Y and Z motion control elements 130 and the galvanometer block 132. These elements combine to position the laser beam (not shown) with respect to the article 138 being marked to create the 2-dimensional representation of the mark on the surface of the article 138. The article 138 is fixtured by the rotary stage element 134 which indexes the article 138 from the load/unload position to a position beneath the optical head 138, where it is marked, and then to an optional inspection station 136 where it is inspected prior to indexing back to the load/unload station for unloading. All of these operations take place under the control of the controller 140, which coordinates the operation of the laser 122, the AOM fluence attenuator 124, the motion control elements 130, the galvanometer block 132 and the rotary stage 134 to direct the appropriate laser fluence to the appropriate locations on the article 136 to create a mark with commercially desirable appearance.

The adapted laser 122 is a diode pumped Nd:YVO$_4$ solid state laser operating at a frequency tripled 355 nm wavelength model Vanguard manufactured by Spectra-Physics, Santa Clara, Calif. 95054. The laser 122 is configured to yield up to 2.5 W, but is generally run at an 80 MHz mode locked pulse repetition rate which yields a power of about 1 W. Lasers with power of 0.5 Watts to 100 Watts or more preferably 0.5 Watts to 12 Watts may be used advantageously by embodiments of this invention. Laser repetition rates of 10 KHz to 500 MHz or more preferably 1 MHz to 100 MHz may be used. The laser 122 produces laser pulses with duration of about 1 picosecond to 1,000 nanoseconds or more preferably 100 picoseconds to nanosecond to 100 nanoseconds in cooperation with controller 100. Pulse temporal and spatial distributions are typically Gaussian. Motion control elements 130 and galvanometer block 132 combine to provide beam positioning capability with respect to the article. Embodiments of this invention use laser spots as measured on the article ranging from 5 microns to 500 microns, or more preferably in the range from 10 microns to 100 microns. The system uses beam speeds, or relative motion between the laser beam and the article in the range of 10 mm/s to 1 m/s, or more preferably in the range of 50 mm/s to 500 mm/s. The pitch, or spacing between adjacent lines of laser pulses can range from 1 micron to 250 microns, or more preferably in the range from 10 microns to 50 microns.

Figure 8:
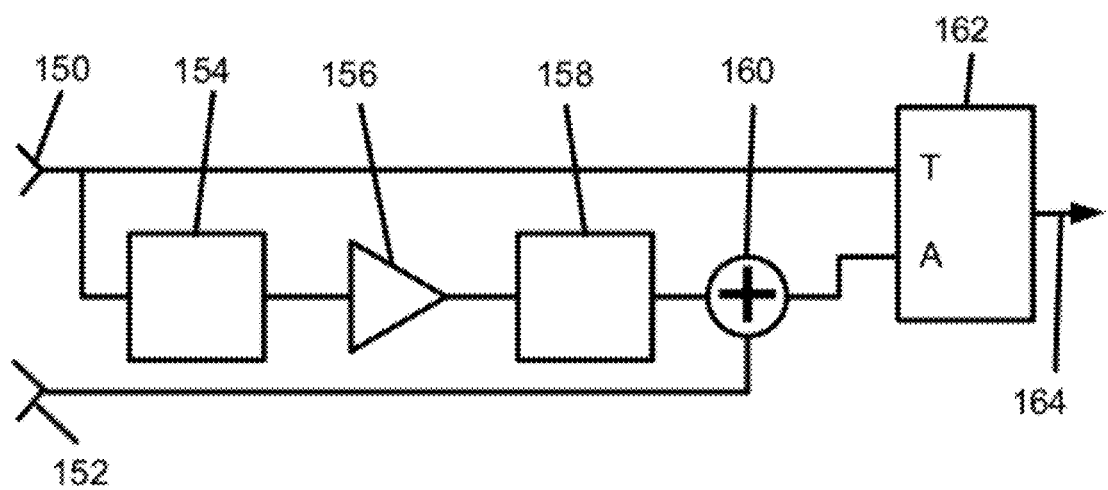

FIG. 8 shows an electronic circuit employed to adapt a laser processing system to operate according to an embodiment of this invention. FIG. 8 shows an input signal 150 from the controller 140 that indicates the start of a laser beam stroke. This signal is typically a logical signal that indicates TRUE/FALSE with voltage levels. When the input signal 150 indicates TRUE, or the beginning of a stroke, the signal is passed to the AOM controller 162 trigger input "T". This indicates that the AOM is active and should be energized to transmit laser pulses. The AOM controller 162 also has an analog voltage input "A" which causes the AOM controller 162 to emit a signal 164 to the AOM (not shown) to transmit laser energy in proportion to the voltage appearing at "A". The trigger signal 150 is also sent to a pulse circuit 154 which produces a pulse with a programmable duration. This pulse is passed to an amplifier 156 which amplifies the pulse produced by pulse circuit 154 to a programmable voltage level. This amplified pulse is conditioned by the signal conditioning filter 158 to remove any undesired components and then combined by the summation circuit 160 with the original pulse voltage 152 output by the controller 140 and sent to the "A" input of the AOM controller 162 for eventual output 164 to the AOM (not shown).

Figure 4C:
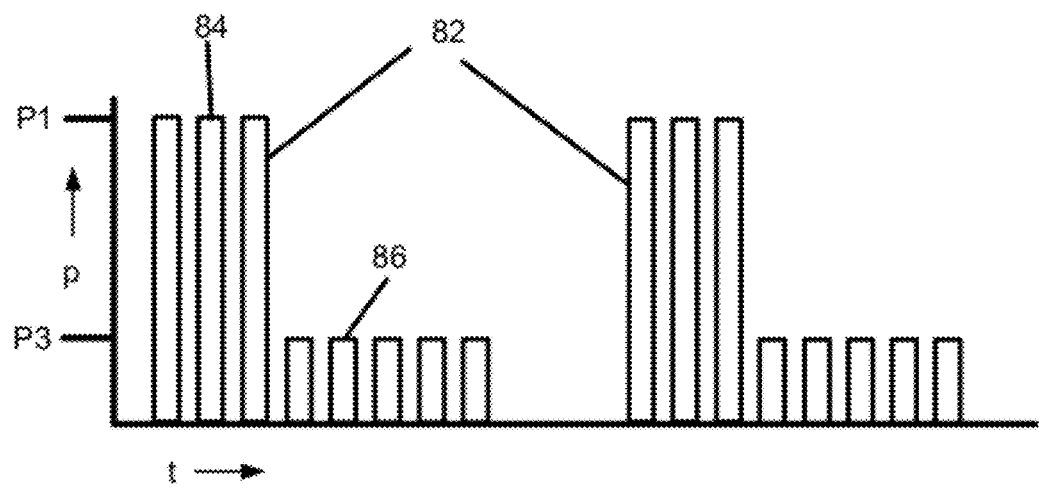

FIGS. 4b and c show the tailored laser pulse groups output from a laser controlled by an AOM control circuit such as FIG. 8. In FIG. 4b, the tailored pulse groups 70 have pulses 72 with energy P1 at the beginning of the group and pulses 78 with energy P2 for the rest of the group. FIG. 4c shows the tailored pulse groups resulting when the analog input 152 to the circuit in FIG. 8 is lowered to a level which produces laser pulses with energy P3. Note that with this embodiment, the energy level of the laser pulses at the beginning of the stroke have constant energy depending upon the programmed setting of amplifier 156.

Figure 4D:
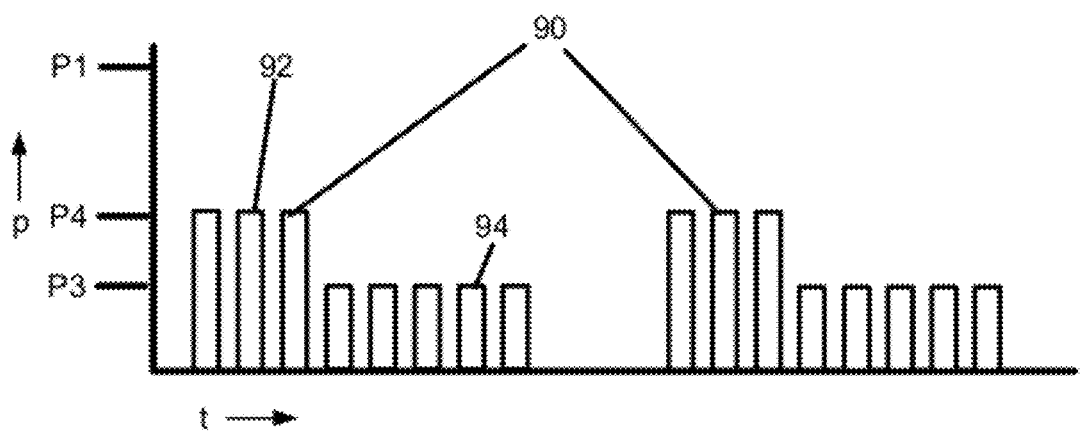
Figure 9:
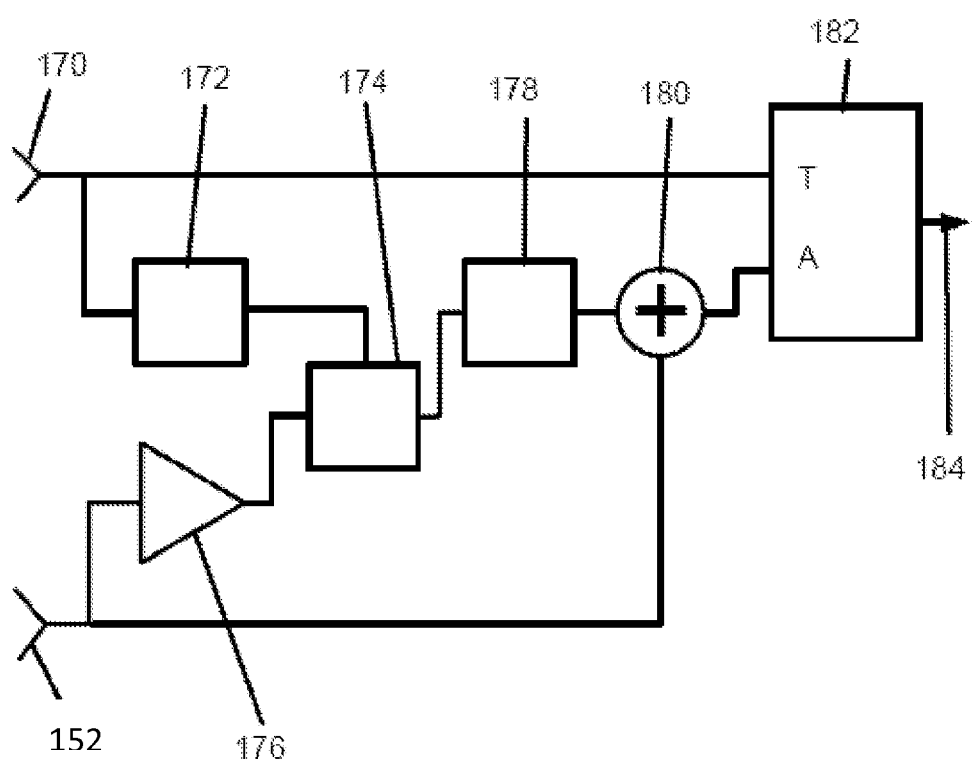

FIG. 9 shows an additional electronic circuit employed to adapt a laser processing system to operate according to an embodiment of this invention. In this circuit, the trigger input 170 from the controller 140 is sent to the trigger input "T" of the AOM controller 182 and to a pulse circuit 172 that generates a programmable duration pulse from the start of the trigger signal. This pulse is sent to an analog, switch 174 which gates the analog signal 152 from the controller 140 that has been amplified by an amplifier 176 with programmable gain. The analog switch 174 transmits the analog signal from 174 when a pulse from pulse circuit 172 is present. The signal then goes to the signal conditioning filter 178 which removes undesired components from the signal and passes it to the combiner 180 which combines the original analog voltage control signal 152 from the controller 140 with the amplified signal from the signal conditioning circuit 178 to form the analog control signal to be sent to the AOM controller 182 for output 184 to the AOM (not shown). This circuit will produce tailored pulses as shown in FIG. 4d. FIG. 4d shows tailored groups of pulses 90 where the high energy pulses 92 at the beginning of each group 90 are made to be a pre-determined multiple P4 of the energy P3 of the predetermined pulses 94.

It will be apparent to those of ordinary skill in the art that many changes may be made to the details of the above-described embodiments of this invention without departing from the underlying principles thereof. The scope of the present invention should, therefore, be determined only by the following claims.

We claim:

1. A laser marking apparatus for creating a mark having desired properties on a specimen, comprising:
   a laser operable for generating a laser beam of laser pulses having selected power, repetition rate, pulse temporal shape, and pulse duration;
   laser optics;
   an optical head including motion control elements operable for positioning the laser beam along a tool path with respect to the specimen;
   a motion stage;
   a system controller operatively connected to the laser, the laser optics, and the motion stage, wherein the controller is configured to store predetermined laser pulse parameters operative for marking the specimen, wherein the predetermined laser pulse parameters include fluence information associated with creating the mark having the desired properties, wherein the fluence information includes first and second fluence information, wherein the first fluence information is associated with a first laser fluence for use in a first portion of a laser beam stroke along the tool path, wherein the second fluence information is associated with a second laser fluence for use in a second portion of the laser beam stroke along the tool path, wherein the second laser fluence is adapted to compensate for a decreased damage threshold of the specimen along the tool path based on calculated residual heating caused by application of the first laser fluence in the first portion of the laser beam stroke along the tool path;
   an extra-cavity acousto-optic modulator (AOM) that is operative to attenuate said laser beam;
   an AOM controller operative to cause the AOM to attenuate the laser beam at a first attenuation level to provide a first group of first laser output pulses at a first predetermined non-zero power level based on the predetermined laser pulse parameters stored in the system controller, and operative to cause the AOM to attenuate the laser beam at a second attenuation level to provide a second group of second laser output pulses at a second predetermined non-zero power level based on the predetermined laser pulse parameters stored in the system controller; and an electronic circuit operative to receive an input signal from the system controller, wherein the input signal is operative to indicate initiation of each of a plurality of laser beam strokes on the specimen, wherein the electronic circuit is operative to pass the input signal to a trigger signal input of the AOM controller to activate the AOM to transmit laser pulses of the laser beam selected by the system controller to perform laser beam strokes on the specimen, wherein the electronic circuit is operative to deliver an analog voltage to an analog voltage input of the AOM controller such that the AOM controller is operative to emit a proportion signal to the AOM to cause the AOM to adjust energy of the laser pulses in proportion to the analog voltage delivered to the analog voltage input, wherein the electronic circuit further comprises a pulse circuit operative to receive the input signal from the system controller, and wherein the pulse circuit is operable to produce a pulse of programmable duration, such that the AOM controller is operative to tailor the first and second laser output pulses to exhibit the respective first and second predetermined non-zero power levels such that the first group of first laser output pulses occurs at the beginning of the laser beam strokes and precedes the second group of second laser output pulses that occurs at the remainder of the laser beam strokes, and such that the first predetermined non-zero power level is greater than the second predetermined non-zero power level.

2. The apparatus of claim 1 wherein said specimen is coated with first and second layers of applied coatings and said desired properties of said mark comprise removing said first layer without damaging said second layer.

3. The apparatus of claim 2, wherein the coatings have ablation and damage thresholds that vary depending on location.

4. The apparatus of claim 2, wherein the coatings have ablation and damage thresholds that vary as a function of time and heat generated by marking of the specimen.

5. The apparatus of claim 2, wherein the first layer overlies the second layer, wherein the first and second layers of applied coatings have different ablation thresholds, and wherein the first layer has an ablation threshold that is lower than that of the second layer.

6. The apparatus of claim 1 wherein said first and second laser pulses comprise pulse fluence ranges from $1.0 \times 10^{-6}$ Joules/cm$^2$ to 1.0 Joules/cm$^2$.

7. The apparatus of claim 1, wherein implementation of the first and second attenuation levels is operable to permit the controller to control fluence of the first and second laser output pulses applied to the specimen without requiring the laser to be turned on and off.

8. The apparatus of claim 1, wherein the system controller is operative to implement a tool path calculated to provide a maximum removal rate without damaging the specimen.

9. The apparatus of claim 1, wherein the electronic circuit further comprises:
an amplifier operative to receive the pulse of programmable duration and amplify it to provide an amplified pulse at a programmable voltage level;
a signal-conditioning filter operative to receive and condition the amplified pulse to provide a conditioned signal; and
a summation circuit operative to receive and combine the conditioned signal with a pulse voltage output from the system controller to provide the analog voltage delivered to the analog input of the AOM controller.

10. The apparatus of claim 1, wherein the electronic circuit further comprises:
an amplifier positioned upstream of the analog voltage input and operative to receive the a pulse voltage output from the system controller and to amplify the pulse voltage output to provide an amplified pulse voltage output;
an analog switch operative to receive the pulse of programmable duration from the pulse circuit and the amplified pulse voltage output from the amplifier and operative to transmit a gated amplified analog signal;
a signal-conditioning filter operative to receive and condition the gated amplified analog signal to provide a conditioned signal; and
a summation circuit operative to receive and combine the conditioned signal with the pulse voltage output from the system controller to provide the analog voltage delivered to the analog input of the AOM controller.

11. The apparatus of claim 1, wherein the system controller is configured to coordinate operation of the laser, the stage, the motion control elements, and the AOM controller so as to direct the first laser fluence in the first portion of the laser beam stroke along the tool path and direct the second laser fluence in the second portion of the laser beam stroke along the tool path to compensate for the decreased damage threshold of the specimen along the tool path based on the calculated residual heating caused by application of the first laser fluence in the first portion of the laser beam stroke along the tool path, thereby creating the mark having the desired properties.

12. A laser marking apparatus for creating a mark having desired properties on a specimen, comprising:
a laser operable for generating a laser beam of laser pulses having selected power, repetition rate, pulse temporal shape, and pulse duration;
laser optics;
an optical head including motion control elements operable for positioning the laser beam with respect to the specimen;
a motion stage;
a system controller operatively connected to the laser, the laser optics, and the motion stage, wherein the controller is operable to store predetermined laser pulse parameters operative for marking the specimen;
an extra-cavity acousto-optic modulator (AOM) that is operative to attenuate said laser beam;
an AOM controller operative to cause the AOM to attenuate the laser beam at a first attenuation level to provide a first group of first laser output pulses at a first predetermined non-zero power level based on the predetermined laser pulse parameters stored in the system controller, and operative to cause the AOM to attenuate the laser beam at a second attenuation level to provide a second group of second laser output pulses at a second predetermined non-zero power level based on the predetermined laser pulse parameters stored in the system controller; and
an electronic circuit operative to receive an input signal from the system controller, wherein the input signal is operative to indicate initiation of each of a plurality of laser beam strokes on the specimen, wherein the electronic circuit is operative to pass the input signal to a trigger signal input of the AOM controller to activate the AOM to transmit laser pulses of the laser beam selected by the system controller to perform laser beam strokes on the specimen, wherein the electronic circuit is operative to deliver an analog voltage to an analog voltage input of the AOM controller such that the AOM controller is operative to emit a proportion signal to the AOM to cause the AOM to adjust energy of the laser pulses in proportion to the analog voltage delivered to the analog voltage input, such that the AOM controller is operative to tailor the first and second laser output pulses to exhibit the respective first and second predetermined non-zero power levels such that the first group of first laser output pulses occurs at the beginning of the laser beam strokes and precedes the second group of second laser output pulses that occurs at the remainder of the laser beam strokes, and such that the first predetermined non-zero power level is greater than the second predetermined non-zero power level, wherein the electronic circuit further comprises:

a pulse circuit operative to receive the input signal from the system controller, wherein the pulse circuit is operable to produce a pulse of programmable duration;

an amplifier operative to receive the pulse of programmable duration and amplify it to provide an amplified pulse at a programmable voltage level;

a signal-conditioning filter operative to receive and condition the amplified pulse to provide a conditioned signal; and a summation circuit operative to receive and combine the conditioned signal with a pulse voltage output from the system controller to provide the analog voltage delivered to the analog input of the AOM controller.

13. The apparatus of claim 12, wherein implementation of the first and second attenuation levels is operable to permit the controller to control fluence of the first and second laser output pulses applied to the specimen without requiring the laser to be turned on and off.

14. The apparatus of claim 12, wherein the system controller is operative to implement a tool path calculated to provide a maximum removal rate without damaging the specimen.

15. The apparatus of claim 12, wherein said specimen is coated with first and second layers of applied coatings and said desired properties of said mark comprise removing said first layer without damaging said second layer, and wherein the coatings have ablation and damage thresholds that vary depending on location.

16. The apparatus of claim 12, wherein said specimen is coated with first and second layers of applied coatings and said desired properties of said mark comprise removing said first layer without damaging said second layer, and wherein the coatings have ablation and damage thresholds that vary as a function of time and heat generated by marking of the specimen.

17. The apparatus of claim 12, wherein said specimen is coated with first and second layers of applied coatings and said desired properties of said mark comprise removing said first layer without damaging said second layer, wherein the first layer overlies the second layer, wherein the first and second layers of applied coatings have different ablation thresholds, and wherein the first layer has an ablation threshold that is lower than that of the second layer.

18. A laser marking apparatus for creating a mark having desired properties on a specimen, comprising:

a laser operable for generating a laser beam of laser pulses having selected power, repetition rate, pulse temporal shape, and pulse duration;

laser optics;

an optical head including motion control elements operable for positioning the laser beam with respect to the specimen;

a motion stage;

a system controller operatively connected to the laser, the laser optics, and the motion stage, wherein the controller is operable to store predetermined laser pulse parameters operative for marking the specimen;

an extra-cavity acousto-optic modulator (AOM) that is operative to attenuate said laser beam;

an AOM controller operative to cause the AOM to attenuate the laser beam at a first attenuation level to provide a first group of first laser output pulses at a first predetermined non-zero power level based on the predetermined laser pulse parameters stored in the system controller, and operative to cause the AOM to attenuate the laser beam at a second attenuation level to provide a second group of second laser output pulses at a second predetermined non-zero power level based on the predetermined laser pulse parameters stored in the system controller; and an electronic circuit operative to receive an input signal from the system controller, wherein the input signal is operative to indicate initiation of each of a plurality of laser beam strokes on the specimen, wherein the electronic circuit is operative to pass the input signal to a trigger signal input of the AOM controller to activate the AOM to transmit laser pulses of the laser beam selected by the system controller to perform laser beam strokes on the specimen, wherein the electronic circuit is operative to deliver an analog voltage to an analog voltage input of the AOM controller such that the AOM controller is operative to emit a proportion signal to the AOM to cause the AOM to adjust energy of the laser pulses in proportion to the analog voltage delivered to the analog voltage input, such that the AOM controller is operative to tailor the first and second laser output pulses to exhibit the respective first and second predetermined non-zero power levels such that the first group of first laser output pulses occurs at the beginning of the laser beam strokes and precedes the second group of second laser output pulses that occurs at the remainder of the laser beam strokes, and such that the first predetermined non-zero power level is greater than the second predetermined non-zero power level, wherein the electronic circuit further comprises:

a pulse circuit operative to receive the input signal from the system controller, wherein the pulse circuit is operable to produce a pulse of programmable duration;

an amplifier positioned upstream of the analog voltage input and operative to receive the a pulse voltage output from the system controller and to amplify the pulse voltage output to provide an amplified pulse voltage output;

an analog switch operative to receive the pulse of programmable duration from the pulse circuit and the amplified pulse voltage output from the amplifier and operative to transmit a gated amplified analog signal;

a signal-conditioning filter operative to receive and condition the gated amplified analog signal to provide a conditioned signal; and a summation circuit operative to receive and combine the conditioned signal with the pulse voltage output from the system controller to provide the analog voltage delivered to the analog input of the AOM controller.

19. The apparatus of claim 18, wherein implementation of the first and second attenuation levels is operable to permit the controller to control fluence of the first and second laser output pulses applied to the specimen without requiring the laser to be turned on and off.

20. The apparatus of claim 18, wherein the system controller is operative to implement a tool path calculated to provide a maximum removal rate without damaging the specimen.

21. The apparatus of claim 18, wherein said specimen is coated with first and second layers of applied coatings and said desired properties of said mark comprise removing said first layer without damaging said second layer, and wherein the coatings have ablation and damage thresholds that vary depending on location.

22. The apparatus of claim 18, wherein said specimen is coated with first and second layers of applied coatings and said desired properties of said mark comprise removing said first layer without damaging said second layer, and wherein the coatings have ablation and damage thresholds that vary as a function of time and heat generated by marking of the specimen.

23. The apparatus of claim 18, wherein said specimen is coated with first and second layers of applied coatings and said desired properties of said mark comprise removing said first layer without damaging said second layer, wherein the first layer overlies the second layer, wherein the first and second layers of applied coatings have different ablation thresholds, and wherein the first layer has an ablation threshold that is lower than that of the second layer.

* * * * *